No. 750,494. Patented January 26, 1904.

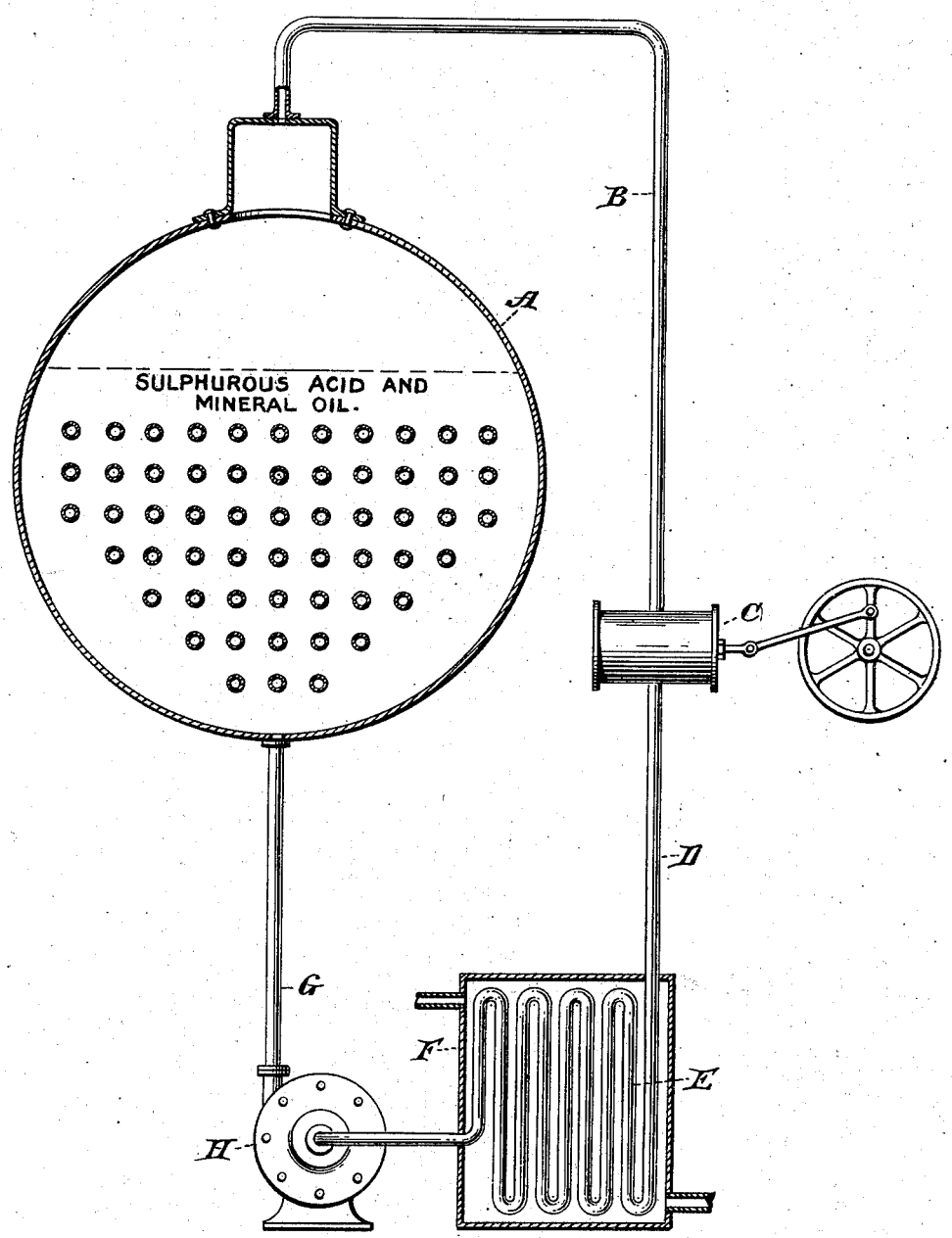

UNITED STATES PATENT OFFICE.

ALFRED SCHÜTT, OF CHARLOTTENBURG, GERMANY.

GENERATION OF MOTIVE POWER.

SPECIFICATION forming part of Letters Patent No. 750,494, dated January 26, 1904.

Application filed May 2, 1903. Serial No. 155,402. (No model.)

*To all whom it may concern:*

Be it known that I, ALFRED SCHÜTT, a subject of the Emperor of Germany, and a resident of Charlottenburg, Germany, have invented certain new and useful Improvements in the Generation of Motive Power, of which the following is a specification.

My invention relates to the production of motive power from vapors of volatile liquids, and has for its object to provide an improved process of heating or vaporizing such liquids.

It has been proposed to mix a volatile liquid with some other liquid of a higher boiling-point, which latter liquid is to be without permanent modifying influence upon the former. The object of this procedure is to subdivide the volatile liquid and to better transmit heat to the individual particles thereof through the medium of the liquid of higher boiling-point, which liquid is generally a better conductor of heat. Another advantage of this procedure is that the amount of volatile liquid is considerably reduced with a vaporizer of a given capacity, since the volatile liquid forms only a portion of the entire amount of liquid heated.

My present invention relates to a particular mode of carrying out the procedure above indicated and has for its object to do this in an especially efficient manner.

I have found that in practice very satisfactory results are obtained by employing a mixture of mineral oils, (carbureted hydrogen,) preferably in a pure condition, with sulfurous acid. It will be understood that in this case the sulfurous acid is the volatile liquid, the vapors of which are utilized to produce mechanical work in a suitable engine, which may be substantially of the character of an ordinary steam-engine. The sulfurous acid and the mineral oils or hydrocarbons do not react upon each other, and thus when a mixture of the two liquids is heated the oil subdivides the sulfurous acid and conducts the heat to the particles thereof, so that when the proper temperature is reached the sulfurous acid will be vaporized, while the oil remains in a liquid condition. There is therefore evolved from the liquid mixture a vapor which consists exclusively of sulfurous acid, or practically so. This vapor may then be utilized as a driving medium in any suitable engine and is generally employed for driving a so-called "cold-vapor" engine. The exhaust-vapor may, if desired, be condensed and returned to the vaporizer, so that the same body of sulfurous acid will be used in a continuous cycle.

Although I prefer to employ pure mineral oils in conjunction with sulfurous acid, I may employ as the liquid of relatively higher boiling-point other hydrocarbons, such as naphtha or glycerin, and the volatile liquid may also be varied. Thus I may use ether in conjunction with naphtha.

The invention described in my present application is included in another application for a patent filed by me in the United States Patent Office on April 23, 1902, Serial No. 104,236.

The accompanying drawing illustrates an apparatus suitable for carrying out my present invention, it being understood that such apparatus is not herein claimed as part of my invention.

A indicates a boiler of the common tubular type; B, a pipe through which the vapor is conveyed to the engine C. The exhaust from said engine passes through the pipe D to a cooling-coil E, located within a condenser F, and the condensed vapor is conveyed back to the boiler A through a return-pipe G, in which a pump H is arranged to propel the liquid.

What I claim, and desire to secure by Letters Patent, is—

The herein-described process of producing motive power which consists in mixing sulfurous acid with a mineral oil, heating the mixture to vaporize the sulfurous acid, while leaving the oil in a liquid condition, and utilizing the sulfurous-acid vapor as a driving medium.

In testimony whereof I have signed my name to this specification in the presence of two subscribing witnesses.

ALFRED SCHÜTT.

Witnesses:
WOLDEMAR HAUPT,
HENRY HASPER.